US006957676B2

(12) United States Patent
Bettiol et al.

(10) Patent No.: US 6,957,676 B2
(45) Date of Patent: Oct. 25, 2005

(54) TIRE FOR A VEHICLE WHEEL INCLUDING AT LEAST TWO CIRCUMFERENTIAL SERIES OF INCLINED INCISIONS DELIMITING AT LEAST THREE ROWS OF BLOCKS

(75) Inventors: Flavio Junior Bettiol, Sao Paolo (BR); Luigi Campana, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 182 days.

(21) Appl. No.: 10/148,418

(22) PCT Filed: Nov. 29, 2000

(86) PCT No.: PCT/EP00/11896

§ 371 (c)(1),
(2), (4) Date: Sep. 24, 2002

(87) PCT Pub. No.: WO01/39994

PCT Pub. Date: Jun. 7, 2001

(65) Prior Publication Data

US 2003/0056867 A1 Mar. 27, 2003

Related U.S. Application Data

(60) Provisional application No. 60/176,628, filed on Jan. 19, 2000.

(30) Foreign Application Priority Data

Nov. 30, 1999 (EP) .............................. 99830743

(51) Int. Cl.$^7$ ....................... B60C 11/11; B60C 103/00; B60C 107/00; B60C 121/00
(52) U.S. Cl. ............................ 152/209.18; 152/209.13; 152/209.22; 152/209.27
(58) Field of Search ....................... 152/209.12, 209.13, 152/209.18, 209.22, 209.27, 902, DIG. 3

(56) References Cited

U.S. PATENT DOCUMENTS

| 3,196,920 A | * 7/1965 | Fishman ................. 152/209.22 |
| 3,237,669 A | * 3/1966 | Travers ................. 152/209.22 |
| 3,939,890 A | 2/1976 | Abe |

(Continued)

FOREIGN PATENT DOCUMENTS

| EP | 0 468 815 A1 | 1/1992 |
| IT | 01245773 | 4/1991 |

(Continued)

Primary Examiner—Steven D. Maki
(74) Attorney, Agent, or Firm—Finnegan, Henderson, Farabow, Garrett & Dunner, L.L.P.

(57) ABSTRACT

The present invention relates to a tire designed to be fitted on the driving axles of a motor vehicle for medium or heavy load. This tire is provided with a tread comprising a plurality of full-depth transverse grooves and four circumferential series of inclined grooves and four circumferential series of inclined incisions which delimit five circumferential rows of blocks, namely two axially outer rows, two intermediate rows, and one central row lying essentially across the equatorial plane.

Each transverse groove extends across the whole width of the tread, and consists of a central portion, located between a pair of consecutive blocks of the central row, and a pair of lateral portions, located between pairs of consecutive blocks of the intermediate and shoulder rows.

The two lateral portions of each transverse groove are staggered circumferentially with respect to each other and penetrate into the body of the central row of blocks. The central portion of the transverse groove has a depth of 3 mm, while the depth of the incisions located between the shoulder blocks and the intermediate blocks is less than the depth of the inclined incisions located between the intermediate blocks and the central blocks.

54 Claims, 4 Drawing Sheets

U.S. PATENT DOCUMENTS

| | | | |
|---|---|---|---|
| 4,412,574 A | | 11/1983 | Popok |
| 5,002,110 A | * | 3/1991 | Tsurunaga et al. ..... 152/209.22 |
| 5,316,062 A | | 5/1994 | Lurois |
| 5,361,816 A | * | 11/1994 | Hitzky ................. 152/209.22 |
| D415,723 S | * | 10/1999 | Roelle et al. .............. D12/599 |
| 6,220,321 B1 | * | 4/2001 | Yoshioka et al. ...... 152/209.22 |
| 6,263,933 B1 | * | 7/2001 | Baus ..................... 152/209.22 |

FOREIGN PATENT DOCUMENTS

| | | | |
|---|---|---|---|
| JP | 4-228308 | * | 8/1992 |
| JP | 2000-177328 | * | 6/2000 |
| WO | WO 98/33669 | | 8/1998 |

* cited by examiner

TIRE FOR A VEHICLE WHEEL INCLUDING AT LEAST TWO CIRCUMFERENTIAL SERIES OF INCLINED INCISIONS DELIMITING AT LEAST THREE ROWS OF BLOCKS

CROSS-REFERENCE TO RELATED APPLICATIONS

This application is a national stage entry under 35 U.S.C. §371 from International Application No. PCT/EP00/11896, filed Nov. 29, 2000, in the European Patent Office, the contents of which are relied upon and incorporated herein by reference; additionally, Applicants claim the right of priority under 35 U.S.C. §119(a)–(d) based on patent application No. 99830743.3, filed Nov. 30, 1999, in the European Patent Office; further, Applicants claim the benefit under 35 U.S.C. §119(e) based on prior-filed, provisional application No. 60/176,628, filed Jan. 19, 2000, in the U.S. Patent and Trademark Office.

BACKGROUND OF THE INVENTION

1. Field of the Invention

The present invention relates to a tyre for motor vehicles, and more particularly to a tyre for heavy motor vehicles such as lorries and similar, used both on roads and on rough ground such as that generally present in quarries and/or on building sites.

More particularly, the present invention relates to tyres to be used on the driving axles, generally the rear axles, of the aforesaid vehicles.

2. Description of the Related Art

In the remainder of the present description and in the following claims, the expression "elastomeric material" is intended to denote a rubber mixture as a whole, in other words one containing at least one base polymer, reinforcing fillers, and further process additives such as accelerators, anti-ageing agents and crosslinking agents used for manufacturing and curing the tyre.

As is known, medium and heavy motor transport vehicles, such as lorries, are generally fitted with tyres whose types differ according to whether they are to be fitted on axles of the driving type or of the driven type, this differentiation being due to the difference in performance and behavioural characteristics required from tyres according to the axles on which they are fitted.

For example, the tyres fitted on the driven axles are primarily required to nave a high directional stability, low abradability, to provide good mileage, and high tear resistance, together with a good grip and lateral roadholding or rough ground, for example on muddy and/or sandy ground.

To achieve these objectives, use is made of tyres having a tread of the type called "grooved", in other words a tread provided with grooves of the circumferential type, with a rectilinear or zigzag configuration, which form on the tread a plurality of circumferential ribs, in other words a plurality of continuous circumferential ribs which normally do not have transverse incisions extending over their whole width.

On the other hand, tyres fitted on the driving wheels have a tread of what is known as the "block" type, since a plurality of blocks is provided, formed by a combination of circumferential grooves intersected by transverse grooves, of considerable width; the dimensions and orientation of these transverse grooves have a considerable effect on the gripping action exerted by the tread on the ground.

Tyres fitted on the driving axles are generally required to have high traction and good roadholding, particularly on loose ground such as that normally present in quarries and/or on building sites.

A further requirement, increasingly manifested on the market and in the legislation of various countries, is for a significant reduction in the noise threshold of the tyre during its normal use on road routes. In this respect it is known that tyres of the "block" type generally have a higher noise level than tyres of the "grooved" type.

A tyre for medium and heavy motor transport vehicles is also generally required to have high regularity of wear, a good mileage, and high tear resistance, together with a tread design capable of effectively expelling stones and/or debris which may be trapped within the grooves formed in the tread.

This is because the continued presence of such stones and/or debris may cause perforations in the tread and, over a period of time, give rise to irreversible damage to the underlying belt layers.

An example of the documents known in the prior art and relating to tyres of the "block" type for medium and heavy motor transport vehicles is Italian patent No. 1,245,773 in the name of the present applicant.

This patent describes a tread comprising at least four rows of blocks delimited by at least three circumferential grooves of different widths, the narrowest two being located laterally, on opposite sides of the equatorial plane of the tyre, in an axially outward position, and by a plurality of oblique transverse grooves connecting adjacent pairs of circumferential grooves.

In this embodiment, the narrow groove separating the two lateral rows of blocks on each shoulder of the tyre is characterized in that it has a width of not more than 2.5 mm and a depth not exceeding that of the oblique transverse grooves, while the blocks of the two lateral rows are staggered circumferentially with respect to each other, so that each block of each row is next to two consecutive blocks of the adjacent row.

In a different embodiment described in this document, two additional, axially inner, circumferential grooves are also provided; these delimit a circumferential rib on whose sides are formed oblique transverse grooves extending to the equatorial plane, in such a way as to impart to this rib the appearance of two adjacent rows of blocks.

The blocks of all the rows have an ordered configuration, in that all the longitudinal sides of the blocks belonging to a given row are positioned in two planes parallel to the equatorial plane.

In a further embodiment, the two rows of blocks of the central rib are joined together to form a single row of blocks passing through the equatorial plane. In a further embodiment, the blocks of the central rib have an essentially hexagonal shape.

Another tyre for lorries, known from U.S. Pat. No. 4,412,574, has a tread which comprises two blocks adjacent in the transverse direction, one being longer than the other, and such that the shorter block follows the longer one, followed in the circumferential direction by another two adjacent blocks whose order is the reverse of the preceding ones: in other words, the longer block follows the shorter block. This configuration is repeated over the whole longitudinal extension of the tread. These pairs of blocks are delimited by transverse grooves which extend between the shoulders of the tread.

SUMMARY OF THE INVENTION

The applicant has tackled the problem of improving the traction of a tyre of the "block" type for medium and heavy motor transport vehicles without adversely affecting the other desired characteristics mentioned above, such as the mileage, the silent running and the tear resistance.

The applicant has found that the traction of a tyre of the "block" type can advantageously be increased by providing the tread with a plurality of transverse grooves which extend from one shoulder of the tyre to the other, each groove being such that it comprises a pair of full-depth lateral portions which come to occupy part of the central body of the tread, which is normally used for the formation of the central blocks.

The applicant has found that these full-depth lateral portions of the said plurality of transverse grooves represent optimal traction elements for gripping the ground. Additionally, in order to maintain the "block" characteristic in all areas of the tread, and therefore also in the central area of the tread, while ensuring a high mileage, the applicant has found that it is helpful to interconnect the said lateral portions of the transverse grooves by means of a central portion whose depth is less than that of the two lateral portions, and in any case is a few millimetres.

This is because providing a central transverse grooved portion of limited depth makes it possible to ensure a high mileage, since adjacent blocks of the central row of the tread are more firmly fixed together, thus opposing in a more effective way the deforming forces exerted on the tread by the ground.

This configuration imparts properties of robustness and abrasion resistance to the central row of blocks, while allowing this row of blocks to bend elastically in the circumferential direction to absorb the roughness of the ground.

The applicant has also found that it is possible to achieve more silent running of the tread by making use of particular configurations of the said central portion of each transverse groove, in such a way that the lateral portions of this groove are staggered with respect to each other.

In one of its aspects, the present invention relates to a tyre for medium and heavy motor transport vehicles, to be used on the driving axles of the said motor vehicles, comprising: a carcass structure including a central crown portion and two sidewalls; a belt structure associated coaxially with the said carcass structure; a tread extending coaxially around the said belt structure and moulded with a relief design comprising a plurality of transverse grooves, which delimit a corresponding plurality of transverse ribs, and at least two circumferential series of incisions inclined with respect to the circumferential direction and formed in the said transverse ribs to delimit at least three rows of blocks, namely two axially outer rows and a central row essentially lying across the equatorial plane of the said tyre, each block having an essentially polygonal shape delimited by two longitudinal sides extending in an essentially circumferential direction and two front and rear transverse edges, the axially outer ends of the said two longitudinal sides of the blocks of the said central row lying on two planes parallel to each other and parallel to the said equatorial plane at a predetermined constant distance w, characterized in that each transverse groove extends over the whole width W of the said tread and comprises a central portion, located between a pair of consecutive blocks of the said central row, and a pair of lateral portions, the said lateral portions being located between respective pairs of consecutive blocks of the said two axially outer rows, and having, along their respective mid-lines, a depth and transverse width which are greater than the depth and transverse width of the said central portions and of the said at least two circumferential series of inclined incisions.

According to the present invention, the said two lateral portions of each transverse groove are preferably staggered with respect to each other in the circumferential direction, and the axially inner ends of the said lateral portions of the said transverse grooves lie on two planes which are parallel to each other and parallel to the said equatorial plane, the said parallel planes lying within the said central row of blocks at a distance of $w_1 < w$ from each other.

Preferably, the depth and width of the said central portion are less than the corresponding dimensions of the said at least two circumferential series of inclined incisions.

In a further embodiment, the tyre according to the invention comprises two further circumferential series of inclined incisions, located axially outside the said at least two circumferential series of inclined incisions, the plurality of the said circumferential series of inclined incisions forming a total of five rows of blocks, namely one central row lying across the said equatorial plane, two shoulder rows and two intermediate rows located between the said central row and the said shoulder rows.

BRIEF DESCRIPTION OF THE DRAWINGS

Further characteristics and advantages will be more clearly evident in the light of the description of a preferred embodiment of the present invention.

This description, given below, relates to the attached drawings, provided solely for the purpose of explanation and without any restrictive intent, in which.

DETAILED DESCRIPTION OF THE PREFERRED EMBODIMENTS

Figure 1:
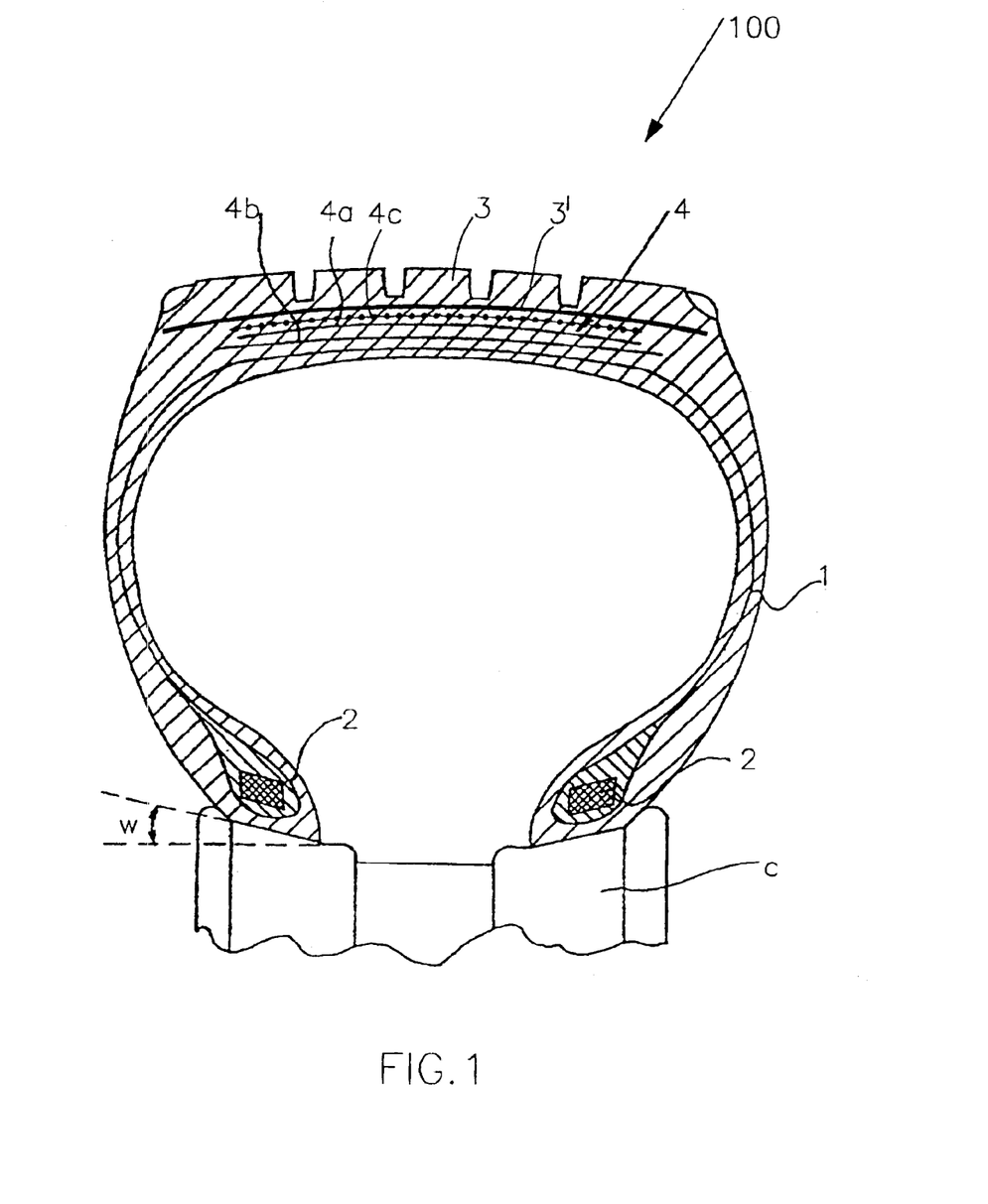
FIG. 1 shows, in partial cross section, the structure of a tyre according to the invention.

FIG. 1 shows a tyre for motor vehicles, designed to be fitted on the rear driving wheel of a motor vehicle for medium or heavy load, for example of a lorry of the type used in quarries and/or on building sites. The dimensional parameters indicated below relate, purely by way of example, to a tread associated with a new prototype tyre of the 13 R 22.5 specification, where 13 indicates the maximum width, in other words the maximum chord, of the tyre, expressed in inches, the said tyre being fitted on the recommended rim and inflated to its nominal operating pressure. However, the ranges of the cited values relate to the generic tyre according to the invention.

The tyre 100 comprises a carcass of toroidal shape, generally consisting of a single reinforcing ply 1 provided with metal cords lying in radial planes, in other words, containing the axis of rotation of the tyre. The ends of the carcass 1 are turned axially, from the inside towards the outside, around two metal annular cores 2, usually known as bead cores, which form the reinforcement of the beads, in other words, of the radially inner edges of the said tyre. As is known, the beads enable the tyre to be fitted on the corresponding fitting rim C. In FIG. 1, the tyre 100, of the tubeless type, is fitted on a rim of what is known as the "channel" type, in which the supporting bases for the beads of the tyre diverge conically outwards at an angle ω of approximately 15°. A tread 3 of elastomeric material, within which is formed a relief pattern providing the ground contact of the tyre 100, is positioned on the crown of the said carcass 1. The tread 3, and the design imparted to it, must be such as to provide the aforesaid tyre with good traction, high mileage, silent running and regularity of wear. The tread 3 has a predetermined thickness and is delimited by an outer surface, designed to contact the ground, and an inner surface placed in contact with a strip 3' made from elastomeric material and designed to promote the necessary adhesion between the elastomeric material of the tread 3 and what is known as the belt package 4 (for example, belt layers 4a, 4b, and 4c).

The aforesaid belt package 4 is a circuferentially inextensible annular reinforcing structure placed betweent he carcass 1 and the tread 3. Generally, the belt package comproises at least two radially superinposed layers 4a, 4b, the said cords are placed parallel to each other, and cross over the cords of the adjacent layer. Preferably, these cords are placed symmetrically with respect to the equatorial plane of the tyre. Also preferably, the aforesaid belt package has a further, third layer 4c of metal cords of the high-elongation type, wound circumberentially on the underlying belt layers, or only in the axially outer positions, in such a way that it is wound around only theedges of the aforesaid underlying layers. This furhter layer performs the function of opposing the forces acting in the tyre in operating conditions that are related to inflation pressure and centrifugal force, and imparts the necessary handling properties, particularly during cornering.

Figure 2:
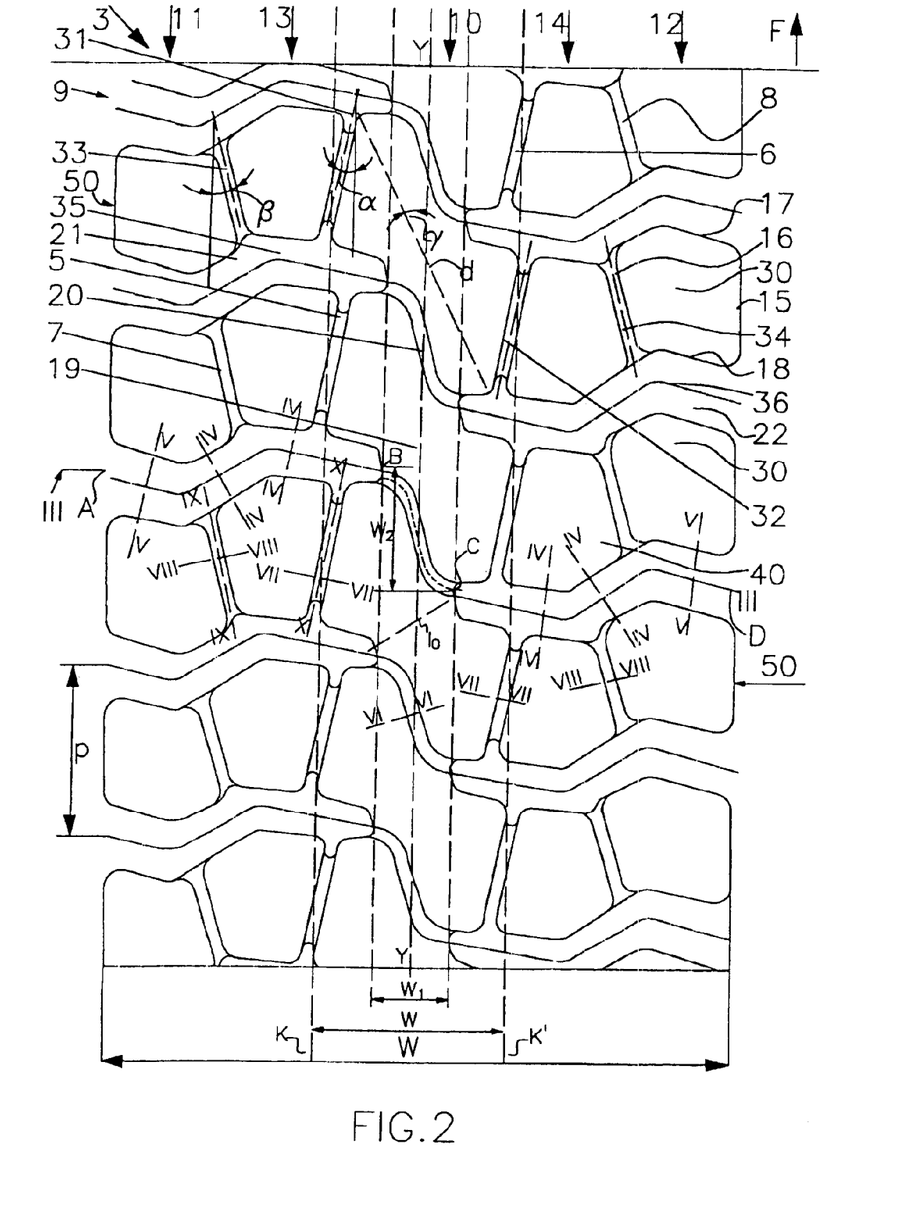
FIG. 2 shows a partial plan view of a tread according to the invention.

FIG. 2 shows, in a partial plan view, the tread 3 in embodim ent of the present invention. This tread 3 comprises a plurality of transverse grooves 9, which extend over the whole width W of the said tread 3 and which delimit a corresponding plurality of transverse ribs 50, and four circumferential series of incisions 5, 6, 7, 8, which are inclined with respect to the circumberential direction and are formed in the said tranverse ribs 50 to form five rows of blocks, namely one central row 10 lying across the equatorial plane Y—Y, two shoulder rows 11, 12 located at the edges of the said tread 3, and two intermediate rows, 13, 14 contained between the said central row 10 and the shoulder rows 11,12.

More specifically, in the embodiment shown in FIG. 2 the mid-line axes 31, 32 of the axially inner series of incisions 5, 6 are parallel to each other and inclined at an angle α to the circumferential direction. Preferably the said angle α is in the range from 5° to 15°.

According to the aforesaid embodiment, the mid-line axes 33, 34 of the axially outer series of incisions 7, 8 are parallel to each other and inclined, in a direction opposite that of the aforesaid mid-line axes 31, 32, at an angle β to the circumferential direction. Preferably the said angle β is in the range from 10° to 20°.

Each transverse groove 9 comprises a central portion 20, lying across the equatorial plane Y—Y and delimited by two consecutive blocks 19 belonging to the aforesaid central row 10, and two lateral portions 21, 22, linked to the central portion 20 on opposite sides of the equatorial plane Y—Y and delimited, respectively, by two consecutive blocks 40 of the intermediate rows 13, 14 and two consecutive blocks 30 of the shoulder rows 11, 12.

The said blocks 19, 30, 40, whose sequence forms the aforesaid plurality of transverse ribs 50, have shapes of the polygonal type which are delimited by a pair of essentially longitudinal sides 15, 16 and by a pair of edges, a front one 17 and a rear one 18, where the direction of rolling of the tyre is indicated by F (FIG. 2). In the rows of intermediate and shoulder blocks positioned on one side of the equatorial plane Y—Y, the aforesaid front and rear edges of adjacent blocks 30, 40 belonging to a single transverse rib 50 are in positions which are the inverse of each other with respect to the circumferential direction. This means, for example, that the front edge 17 of the block 30, when rotated through 180°, is essentially identical to the rear edge 18 of the block 40. The same relationship is also established between the rear edge 18 of the block 30 and the front edge 17 of the block 40. Furthermore, as shown in FIG. 2, the blocks belonging to the intermediate rows positioned on opposite sides of the equatorial plane Y—Y have front and rear edges which are inverted with respect to each other. For example, the front edge 17 of a block 40 of the intermediate row 13 has an essentially pointed shape identical to the shape of the rear edge 18 of a block 40 of the intermediate row 14. A similar situation is found in the case of the blocks belonging to the shoulder rows positioned on opposite sides of the equatorial plane Y—Y. For example, the front edge 17 of a block 30 of the shoulder row 11 has a shape identical to that of the rear edge 18 of a block 30 of the shoulder row 12.

Additionally, the axially outer edges of the longitudinal sides 15, 16 of the blocks 19 belonging to the central row 10 lie in two planes k, k' which are parallel to each other and parallel to the equatorial plane Y—Y. The distance between the aforesaid planes k, k' is constant and equal to w.

The mid-line axes 35, 36 of the two lateral portions 21, 22 respectively of the transverse groove 9 have a zigzag configuration delimited by a sequence of three rectilinear portions; additionally, the mid-line 36 of the lateral portion 22 of the said transverse groove 9 is rotated through 180°, relative to the circumferential direction, with respect to the mid-line 35 of the lateral portion 21.

In the embodiment shown in FIG. 2, the shapes and sizes of the transverse grooves 9 are identical to each other.

As stated above, the axially inner ends of the lateral portions 21, 22 of each transverse groove 9 are joined to the ends of the corresponding central portion 20. Additionally, the said axially inner ends of the lateral portions 21, 22 are spaced from each other by a distance $w_1 < w$, and are also circumferentially staggered with respect to each other by a predetermined distance $w_2$.

For some embodiments of the present invention, Table 1 shows the preferred ranges of the aforesaid values w, $w_1$ and $w_2$, and their ratios to the overall width W of the tread 3 and to the pitch p of the repetition of the relief design of the aforesaid tread in the circumferential direction.

TABLE 1

| Value | Preferred range of values |
|---|---|
| w (mm) | 72–80 |
| w/W | 0.25–0.35 |
| $w_1$ (mm) | 30–32 |
| $w_1$/W | 0.115–0.125 |
| $w_2$ (mm) | 40–55 |
| $w_2$/p | 0.6–0.7 |

Additionally, the lateral portions 21, 22 of each transverse groove 9 have a depth h and width l (see FIGS. 4 and 5), measured orthogonally to the mid-lines 35 and 36 respectively, which are greater than the corresponding dimensions of the central portion 20 of the said transverse groove 9 and of the aforesaid inclined incisions 5, 6, 7, 8.

In fact, if the depths of the central portion 20 of each transverse groove 9 and of the inclined incisions 5, 6 and 7, 8 are indicated, respectively, by $h_1$ (see FIG. 6), $h_2$ (see FIG. 7), and $h_3$ (see FIG. 8), the said depths are less than h and, more precisely, it is found that $h_1 < h_3 < h_2 < h$.

In the embodiment shown in FIG. 2, the central portion 20 of the transverse grooves 9 and the inclined incisions 5, 6, 7, 8 also have the same width $l_1$.

For some embodiments of the present invention, Table 2 shows preferred embodiments of the aforesaid values of depth and width of the transverse grooves 9 and of the inclined incisions 5, 6, 7, 8.

TABLE 2

| Value | Preferred range of values |
|---|---|
| h (mm) | 18–24 |
| l (mm) | 15–22 |
| l/p | 22%–26% |
| $h_1$ (mm) | 2–6 |
| $h_2$ (mm) | 7–15 |
| $h_3$ (mm) | 4–10 |
| $l_1$ (mm) | 3–8 |

Preferably, h is equal to 21 mm, l/p is equal to 24%, $h_1$ is equal to 3 mm, $h_2$ is equal to 9 mm, $h_3$ is equal to 6 mm, and $i_1$ is equal to 2.5 mm.

The blocks 40 of the intermediate rows 13, 14 and the blocks 30 of the shoulder rows 11, 12 have an essentially pentagonal shape, while the blocks 19 of the central row 10 are essentially in the shape of parallelograms, elongated in the circumferential direction. More particularly, the said blocks 19 have a configuration determined by a diagonal d running between the axially inner ends of the essentially longitudinal sides 15, 16, the said diagonal d forming an angle γ with the circumferential direction. Preferably, the said angle γ is in the range from 22° to 35°.

The design of the tread 3 according to the present invention, as shown clearly in FIG. 2, is such that the portion to the right of the equatorial plane Y-Y corresponds exactly to the portion to the left of the said plane, rotated through 180° with respect to the equatorial plane.

Consequently, the tyre according to the invention does not have a preferred direction of travel.

In the tread 3 according to the present invention, the lateral portions 21, 22 of the transverse grooves 9 extend to occupy part of the central area of the said tread. By way of example only, in the embodiment shown in FIG. 2 the two lateral portions 21, 22 represent 87% of the width W of the tread 3. More particularly, the difference $w-w_1$ provides a measurement of the extent to which the aforesaid lateral portions 21, 22 extend into the central row 10.

Consequently, since these lateral portions also occupy part of the central area of the tread, and since, as stated above, the length l and the depth h of these lateral portions are markedly greater than the length and depth of the central portion 20 and of the inclined incisions 5, 6, 7 and 8, these aspects enable the properties of traction and lateral road-holding of the tyre according to the invention to be advantageously enhanced.

It should also be pointed out that the aforesaid increase in traction is achieved without adversely affecting the mileage of the tyre, owing to the particular robustness of the central row 10.

Figures 3, 4, 5, 6, 7, 8, 9, 10:
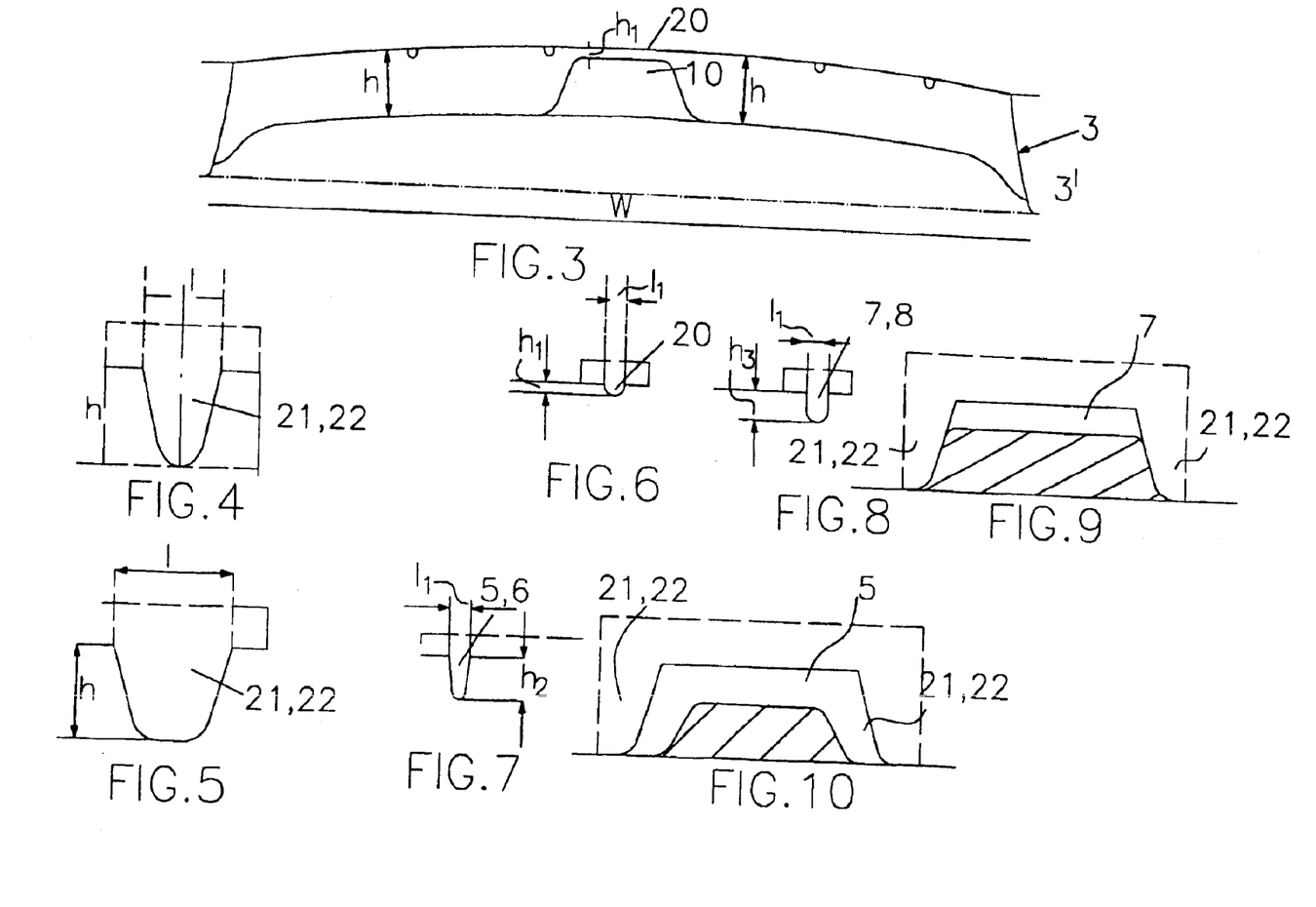
FIG. 3 shows a partial cross section of FIG. 2, through the plane following the line III-A-B-C-D-III.
FIG. 4 shows a partial cross section of FIG. 2 through the plane IV—IV.
FIG. 5 shows a partial cross section of FIG. 2 through the plane V—V.
FIG. 6 shows a partial cross section of FIG. 2 through the plane VI—VI.
FIG. 7 shows a partial cross section of FIG. 2 through the plane VII—VII.
FIG. 8 shows a partial cross section of FIG. 2 through the plane VIII—VIII.
FIG. 9 shows a partial cross section of FIG. 2 through the plane IX—IX.
FIG. 10 shows a partial cross section of FIG. 2 through the plane X—X.

In fact, as shown in FIGS. 2, 3 and 6, the central portion 20 of each transverse groove 9 has dimensions (depth and width) which are considerably smaller than those of the lateral portions 21, 22.

In one embodiment of the invention, for example, the central portion 20 has a depth of 3 mm, while the lateral portions 21, 22 have a depth of 21 mm.

This means that the central row 10 acts as a solid continuous rib, in spite of the presence of the blocks 19, since, owing to the very limited depth (3 mm) of the central portion 20, the aforesaid blocks are firmly fixed to the base of the rib and essentially without flexural mobility, which is a primary cause of wear of the tread design.

The resulting row of central blocks can effectively withstand the stresses exerted on the tyre by the ground, and can therefore yield a high mileage.

Moreover, the staggering of the lateral portions 21, 22. of each transverse groove 9 in the circumferential direction (this staggering being indicated by the value $w_2$) imparts a considerable tear resistance to the blocks 19 of the central row 10.

This is because, as shown in FIG. 2, the staggering $w_2$ between the axially inner ends of the lateral portions 21, 22 corresponds to a width $l_0$ of each block 19 which is greater than $w_1$. This means that, owing to the presence of the circumferential staggering $w_2$ and therefore owing to the inclined configuration of the blocks 19 with respect to the equatorial plane, these blocks have a larger quantity of elastomeric material than they would have if this circumferential staggering were not present The aforesaid larger quantity of elastomeric material of the blocks 19 imparts to these blocks a higher resistance to the mechanical stresses exerted by the ground on the tread 3 in operating conditions.

As shown by FIG. 2, the blocks and grooves of the tread according to the present invention are linked together by portions of the curvilinear type having radii of curvature preferably in the range from 2 mm to 10 mm, and more preferably from 4 mm to 8 mm. The presence of these links of the curvilinear type is particularly advantageous in terms of uniformity and wear of the tyre.

Figure 11:
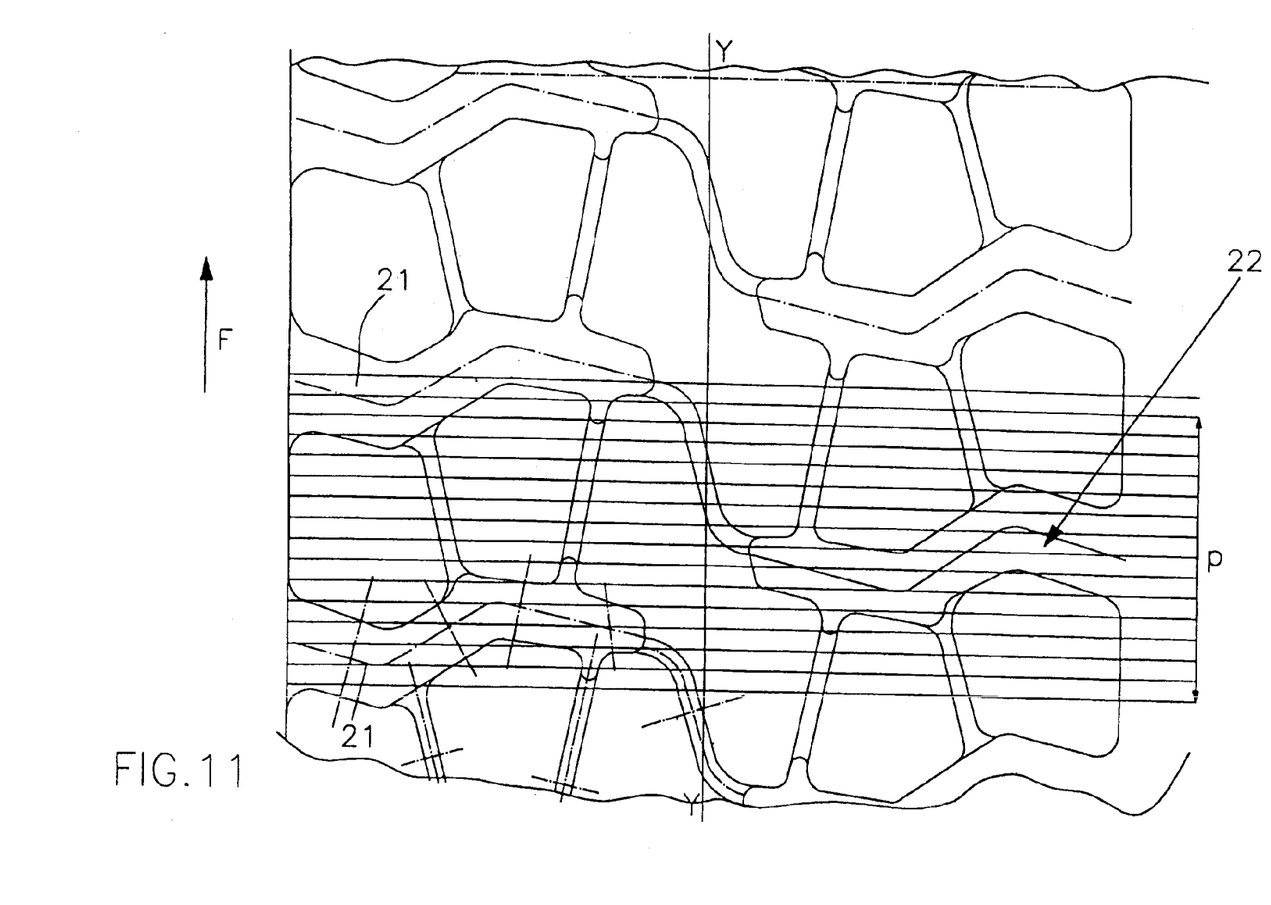
FIG. 11 shows a succession of gripping edges, in a given pitch and for a given direction of travel, applied to the partial plan view of FIG. 2.

The tread according to the invention also has advantageous characteristics of low noise FIG. 11 shows a partial plan view of a tread 3 according to the invention, in the embodiment shown in FIG. 2. The said FIG. 11 shows a plurality of lines positioned perpendicularly to the equatorial plane Y—Y, representing the advance of the impact edges of the tread of the tyre on the ground during the travel of the tyre.

With reference to the direction of rolling F of FIG. 11, the advance of the impact edges shows, for example, that the lateral portion 22 of the transverse groove 9 starts to grip when a corresponding lateral portion 21 of the same transverse groove 9 has practically terminated its gripping action. It can also be seen that two separate transverse grooves are gripping simultaneously when one of the two is in the final gripping phase and the other is in the initial gripping phase.

The said transverse grooves 9 therefore tend to operate in succession, preventing the development of discontinuities, for example in respect of performance in terms of roadholding and noise, due to a simultaneous entry and/or exit of different ground gripping elements.

This means that the continuous traction of the tread is advantageously ensured in any direction of travel of the tyre, thus improving the comfort, stability of travel and mileage.

Together with the aforesaid noise reduction, the progressive gripping of the ground by the traction elements ensures a more regular wear of the tread, with a consequent increase in the mileage of the tyre according to the invention.

As mentioned above in the present description, the incisions 5 and 6 have a greater depth than the incisions 7 and 8. For example, in a particular embodiment, the incisions 5 and 6 have a depth of 9 mm, while the incisions 7 and 8 have a depth of 6 mm, whereas the maximum depth of the transverse grooves 9 is 21 mm. The depth of the incisions 5, 6 is therefore chosen in such a way that for half of the life of the tyre the intermediate blocks 40 are released from the adjacent central blocks 19, improving the flexibility of the tread 3, while the depth of the incisions 7, 8 is chosen in such a way as to make the shoulder blocks 30 integral with the adjacent intermediate blocks 40, thus improving the tear resistance of the tread 3 according to the invention.

Additionally, the shape and dimensions of the transverse grooves 9 are chosen in such a way as to make them self-cleaning, to remove stones and/or debris which may be trapped in the said grooves during the travel of the tyre.

This result is achieved by using a high value of the minimum width l and by providing the said transverse grooves with lateral walls which converge towards the base, the said walls forming an angle of at least 30° between them.

More particularly, in order to ensure optimal self-cleaning of the said transverse grooves, the width of these grooves increases (see FIG. 2) at the shoulder ends.

It is clear, therefore, that the present invention has made it possible to integrate into the tread design certain design characteristics which oppose each other—each being negative with respect to at least one of the different behaviours required from the tyre, since it is positive only in respect of a single aspect of its behaviour—in a synergic combination, which provides an exclusively positive overall outcome, in other words one equal to or better than that found in known tyres, in respect of any aspect of the behaviour on the road.

A person skilled in the art, having understood the invention as described above, will be capable of making all the necessary choices, variations and modifications of the variables associated with the invention, to resolve the specific technical problem faced by him, in other words to give priority to one specific aspect of behaviour (for example aquaplaning rather than silent running, by increasing the depth of the inclined incisions, or the traction rather than the wear, by increasing the depth and/or width of the transverse grooves, etc.) according to the severity of the operating conditions and/or the particular type of application of the vehicle which is to be fitted with the tyres according to the invention.

What is claimed is:

1. A tyre for a vehicle wheel, comprising:

a carcass structure;

a belt structure coaxially associated with the carcass structure; and a tread coaxially extending around the belt structure;

wherein the carcass structure comprises a central crown portion and two axially opposed sidewalls, wherein the tread is moulded with a relief design comprising a plurality of transverse grooves and at least two circumferential series of incisions, wherein the transverse grooves delimit a corresponding plurality of transverse ribs, wherein the at least two circumferential series of incisions are inclined with respect to a circumferential direction of the tyre, wherein the at least two circumferential series of incisions delimit at least three rows of blocks, wherein the at least three rows of blocks comprise a central row and two axially outer rows, wherein the blocks of the central row essentially lie across an equatorial plane of the tyre, wherein each block comprises an essentially polygonal shape, wherein the essentially polygonal shape is delimited by two longitudinal sides, a front transverse edge, and a rear transverse edge, wherein the two longitudinal sides extend in an essentially circumferential direction, wherein, for the blocks of the central row, axially outer ends of the two longitudinal sides lie on two first planes parallel to each other, wherein the two first planes are a first distance from each other, wherein the two first planes are parallel to the equatorial plane of the tyre, wherein each transverse groove extends over an entire width of the tread, wherein each transverse groove comprises a central portion and two lateral portions, wherein the central portion is located between a pair of consecutive blocks of the central row, wherein at least part of the lateral portions are located between respective pairs of consecutive blocks of the two axially outer rows, wherein each lateral portion comprises, along a respective mid-line axis, a first depth that is greater than a second depth of a respective central portion, wherein each lateral portion comprises, along the respective mid-line axis, a first width that is greater than a second width of the respective central portion, wherein the first depth is also greater than a third depth of the at least two circumferential series of incisions, wherein the first width is also greater than a third width of the at least two circumferential series of incisions, wherein the mid-line axis of each lateral portion comprises a zigzag configuration, wherein the lateral portions of each transverse groove are staggered with respect to each other in the circumferential direction, and wherein axial inner ends of the lateral portions of each transverse groove are staggered with respect to each other in the circumferential direction by a third distance in a range from 60% to 70% of a pitch of the tread.

2. The tyre of claim 1, wherein the axially inner ends of the two lateral portions lie on two second planes parallel to each other,
wherein the two second planes are a second distance from each other,
wherein the two second planes are parallel to the equatorial plane of the tyre, and
wherein the second distance is less than the first distance.

3. The tyre of claim 2, wherein the second distance is in a range from 11.5% to 12.5% of the entire width of the tread.

4. The tyre of claim 1, wherein the second depth is less than the third depth, and
wherein the second width is less than the third width.

5. The tyre of claim 1, wherein the first distance is not less than 25% of the entire width of the tread.

6. The tyre of claim 5, wherein the first distance is in a range from 72 mm to 80 mm.

7. The tyre of claim 1, wherein the first depth is in a range from 18 mm to 24 mm.

8. The tyre of claim 1, wherein the first width is in a range from 15 mm to 22 mm.

9. The tyre of claim 1, wherein the first width is in a range from 22% to 26% of a pitch of the tread.

10. The tyre of claim 1, wherein the third distance is in a range from 40 mm to 55 mm.

11. The tyre of claimed 1, wherein a fourth width of the central portion in an axial direction is not more than 32 mm.

12. The tyre of claim 1, wherein the second depth is not more than 6 mm.

13. The tyre of claim 1, wherein the third width is not more than 8mm.

14. The tyre of claim 1, wherein the third depth is not more than 15 mm.

15. The tyre of claim 1, wherein the second width is equal to the third width.

16. The tyre of claim 1, wherein the tread comprises at least four circumferential series of incisions,
where the at least four circumferential series of incisions delimit at least five rows of blocks, and
wherein the at least five rows of blocks comprise a central row, two axially inner rows, and two axially outer rows.

17. The tyre of claim 16, wherein the at least four circumferential series of incisions comprise at least two axially inner circumferential series and at least two axially outer circumferential series, and
wherein a fourth depth of the at least two axially outer circumferential series is less than a fifth depth of the at least two axially inner circumferential series.

18. The tyre of claim 17, wherein the fourth depth is in a range from 4 mm to 10 mm.

19. The tyre of claim 17, wherein a fifth width of the at least two axially outer circumferential series of incisions is equal to a sixth width of the at least two axially inner circumferential series of incisions.

20. The tyre of claim 17, wherein the at least two axially inner circumferential series of incisions are inclined at a second angle in a range from 5° to 15° with respect to the circumferential direction of the tyre, and
wherein the at least two axially outer circumferential series of incisions are inclined at a third angle in a range from 10° to 20° with respect to the circumferential direction of the tyre.

21. The tyre of claim 17, wherein mid-line axes of the at least two axially inner circumferential series of incisions are inclined, with respect to the circumferential direction of the tyre, in a direction opposite to mid-line axes of the at least two axially outer circumferential series of incisions.

22. The tyre of claim 1, wherein the at least two circumferential series of incisions are inclined at a first angle in a range from 5° to 15° with respect to the circumferential direction of the tyre.

23. The tyre of claim 1, wherein the zigzag configuration of the mid-line axes of the lateral portions is formed by a succession of at least three rectilinear sections.

24. The tyre of claim 1, wherein the mid-line axis of a first lateral portion of a transverse groove, when rotated through 180° with respect to the circumferential direction of the tyre, lies along the mid-line axis of a second lateral portion of the transverse groove.

25. The tyre of claim 1, wherein shapes and dimensions of each transverse groove are substantially identical.

26. The tyre of claim 1, wherein the essentially polygonal shape of each block of the central row approximates a parallelogram having a diagonal running between axially inner ends of the two longitudinal sides, and
wherein the diagonal forms a fourth angle with respect to the circumferential direction of the tyre.

27. The tyre of claim 26, wherein the fourth angle is in a range from 22° to 35°.

28. A tyre for a vehicle wheel, comprising:
a carcass structure;
a belt structure coaxially associated with the carcass structure; and
a tread coaxially extending around the belt structure;
wherein the carcass structure comprises a central crown portion and two axially opposed sidewalls,
wherein the tread is moulded with a relief design comprising a plurality of transverse grooves and at least four circumferential series of incisions,
wherein the transverse grooves delimit a corresponding plurality of transverse ribs,
wherein the at least four circumferential series of incisions are inclined with respect to a circumferential direction of the tyre,
wherein the at least four circumferential series of incisions delimit at least five rows of blocks,
wherein the at least five rows of blocks comprise a central row, two axially inner rows, and two axially outer rows,
wherein the blocks of the central row essentially lie across an equatorial plane of the tyre,
wherein each block comprises an essentially polygonal shape,
wherein the essentially polygonal shape is delimited by two longitudinal sides, a front transverse edge, and a rear transverse edge,
wherein the two longitudinal sides extend in an essentially circumferential direction,
wherein, for the blocks of the central row, axially outer ends of the two longitudinal sides lie on two first planes parallel to each other,
wherein the two first planes are a first distance from each other,
wherein the two first planes are parallel to the equatorial plane of the tyre,
wherein each transverse groove extends over an entire width of the tread,
wherein each transverse groove comprises a central portion and two lateral portions, wherein the central portion is located between a pair of consecutive blocks of the central row, wherein at least part of the lateral portions are located between respective pairs of consecutive blocks of the two axially outer rows, wherein each lateral portion comprises, along a respective mid-line axis, a first depth that is greater than a second depth of a respective central portion, wherein each lateral portion comprises, along the respective mid-line axis, a first width that is greater than a second width of the respective central portion, wherein the first depth is also greater than a third depth of the at least four circumferential series of incisions, wherein the first width is also greater than a third width of the at least four circumferential series of incisions, wherein the at least four circumferential series of incisions comprise at least two axially inner circumferential series and at least two axially outer circumferential series, and wherein mid-line axes of the at least two axially inner circumferential series of incisions are inclined, with respect to the circumferential direction of the tyre, in a direction opposite to mid-line axes of the at least two axially outer circumferential series of incisions.

29. The tyre of claim 28, wherein the two lateral portions of each transverse groove are staggered with respect to each other in the circumferential direction of the tyre.

30. The tyre of claim 28, wherein axially inner ends of the two lateral portions lie on two second planes parallel to each other, wherein the two second planes are a second distance from each other, wherein the two second planes are parallel to the equatorial plane of the tyre, and wherein the second distance is less than the first distance.

31. The tyre of claim 30, wherein the second distance is in a range from 11.5% to 12.5% of the entire width of the tread.

32. The tyre of claim 30, wherein the axially inner ends are staggered with respect to each other in a circumferential direction of the tyre by a value in a range from 60% to 70% of a pitch of the tread.

33. The tyre of claim 30, wherein the axially inner ends are staggered with respect to each other in a circumferential direction of the tyre by a value in a range from 40 mm to 55 mm.

34. The tyre of claim 28, wherein the second depth is less than the third depth, and wherein the second width is less than the third width.

35. The tyre of claim 28 wherein the first distance is not less than 25% of the entire width of the tread.

36. The tyre of claim 35, wherein the first distance is in a range from 72 mm to 80 mm.

37. The tyre of claim 28, wherein the first depth is in a range from 18 mm to 24 mm.

38. The tyre of claim 28, wherein the first width is in a range from 15 mm to 22 mm.

39. The tyre of claim 28, wherein the first width is in a range from 22% to 26% of a pitch of the tread.

40. The tyre of claim 28, wherein a fourth width of the central portion in an axial direction is not more than 32 mm.

41. The tyre of claim 28, wherein the second depth is not more than 6 mm.

42. The tyre of claim 28, wherein the third width is not more than 8 mm.

43. The tyre of claim 28, wherein the third depth is not more than 15 mm.

44. The tyre of claim 28, wherein the second width is equal to the third width.

45. The tyre of claim 28, wherein a fifth width of the at least two axially outer circumferential series of incisions is equal to a sixth width of the at least two axially inner circumferential series of incisions.

46. The tyre of claim 28, wherein the at least two axially inner circumferential series of incisions are inclined at a first angle in a range from 5° to 15° with respect to the circumferential direction of the tyre.

47. The tyre of claim 28, wherein the at least two axially inner circumferential series of incisions are inclined at a second angle in a range from 5° to 15° with respect to the circumferential direction of the tyre, and wherein the at least two axially outer circumferential series of incisions are inclined at a third angle in a range from 10° to 20° with respect to the circumferential direction of the tyre.

48. The tyre of claim 28, wherein the mid-line axes of the lateral portions have a zigzag configuration formed by a succession of at least three rectilinear sections.

49. The tyre of claim 28, wherein the mid-line axis of a first lateral portion of a transverse groove, when rotated through 180° with respect to the circumferential direction of the tyre, lies along the mid-line axis of a second lateral portion of the transverse groove.

50. The tyre of claim 28, wherein shapes and dimensions of each transverse groove are substantially identical.

51. The tyre of claim 28, wherein the essentially polygonal shape of each block of the central row approximates a parallelogram having a diagonal running between axially inner ends of the two longitudinal sides, and wherein the diagonal forms a fourth angle with respect to the circumferential direction of the tyre.

52. The tyre of claim 51, wherein the fourth angle is in a range from 22° to 35°.

53. The tyre of claim 28, wherein a fourth depth of the at least two axially outer circumferential series is less than a fifth depth of the at least two axially inner circumferential series.

54. The tyre of claim 53, wherein the fourth depth is in a range from 4 mm to 10 mm.

\* \* \* \* \*

UNITED STATES PATENT AND TRADEMARK OFFICE
CERTIFICATE OF CORRECTION

PATENT NO. : 6,957,676 B2
DATED : October 25, 2005
INVENTOR(S) : Flavio Junior Bettiol et al.

It is certified that error appears in the above-identified patent and that said Letters Patent is hereby corrected as shown below:

Title page,
Item [57], ABSTRACT, should read:
-- A tyre for a vehicle wheel includes a carcass structure, a belt structure coaxially associated with the carcass structure, and a tread coaxially extending around the belt structure. The tread includes a plurality of transverse grooves and at least two circumferential series of incisions. The transverse grooves delimit a plurality of transverse ribs. The at least two circumferential series of incisions delimit at least three rows of blocks, a central row and two axially-outer rows. Each block inludes an essentially-polygonal shape delimited by two longitudinal sides, a front transverse edge, and a rear transverse edge. Each transverse groove extends over an entire width of the tread and includes a central portion and two lateral portions. The central portion is located between a pair of consecutive blocks of the central row. At least part of the lateral portions are located between respective pairs of consecutive blocks of the two axially-outer rows. --.

Column 11,
Line 28, "claimed 1," should read -- claim 1, --.
Line 33, "8mm." should read -- 8 mm. --.

Column 13,
Line 52, "claim 28", should read -- claim 28, --.

Signed and Sealed this

Twenty-eighth Day of March, 2006

JON W. DUDAS
*Director of the United States Patent and Trademark Office*